United States Patent
Singh et al.

(10) Patent No.: US 10,343,240 B2
(45) Date of Patent: Jul. 9, 2019

(54) VERTICAL BUNDLE AIR-COOLED HEAT EXCHANGER, METHOD OF MANUFACTURING THE SAME, AND POWER GENERATION PLANT IMPLEMENTING THE SAME

(71) Applicant: Holtec International, Camden, NJ (US)

(72) Inventors: Krishna P. Singh, Hobe Sound, FL (US); Indresh Rampall, Cherry Hill, NJ (US); Joseph Rajkumar, Cherry Hill, NJ (US); Frank David Sanderlin, San Diego, CA (US)

(73) Assignee: Holtec International

( * ) Notice: Subject to any disclaimer, the term of this patent is extended or adjusted under 35 U.S.C. 154(b) by 0 days.

(21) Appl. No.: 15/715,897

(22) Filed: Sep. 26, 2017

(65) Prior Publication Data

US 2018/0029175 A1    Feb. 1, 2018

Related U.S. Application Data

(63) Continuation of application No. 14/123,678, filed as application No. PCT/US2012/040806 on Jun. 4, 2012, now Pat. No. 9,770,794.

(Continued)

(51) Int. Cl.
*B23P 15/26* (2006.01)
*F28D 7/10* (2006.01)
*F28B 1/06* (2006.01)
*F28B 9/10* (2006.01)
*F28F 1/16* (2006.01)
(Continued)

(52) U.S. Cl.
CPC .............. *B23P 15/26* (2013.01); *B21C 23/00* (2013.01); *F28B 1/06* (2013.01); *F28B 9/10* (2013.01); *F28D 1/024* (2013.01); *F28D 7/10* (2013.01); *F28F 1/003* (2013.01); *F28F 1/16* (2013.01); *F28F 1/20* (2013.01); *F28F 2215/04* (2013.01);
(Continued)

(58) Field of Classification Search
CPC ... B23P 15/26; F28F 1/003; F28F 1/16; F28F 1/20; F28F 2215/04; F28F 2275/125; B21C 23/00; F28B 9/10; F28B 1/06; F28D 1/024; F28D 7/10
See application file for complete search history.

(56) References Cited

U.S. PATENT DOCUMENTS

3,887,004 A    6/1975    Beck
4,419,802 A    12/1983    Riese
(Continued)

*Primary Examiner* — Moshe Wilensky
(74) *Attorney, Agent, or Firm* — The Belles Group, P.C.

(57) ABSTRACT

A vertical bundle air-cooled heat exchanger. In one embodiment, the invention can be a vertical bundle air-cooled condenser comprising: at least one tube bundle assembly comprising: a tube bundle comprising a plurality of finned tubes arranged in a substantially vertical and side-by-side orientation, each of the plurality of finned tubes comprising a cavity; a top header pipe comprising an inlet header cavity operably coupled to a source of steam; a bottom header pipe comprising an outlet header cavity for collecting condensate; top ends of the plurality of finned tubes coupled to the top header pipe and the bottom ends of the plurality of finned tubes coupled to the bottom header pipe; and a shell having an open top end and open bottom end, the at least one tube bundle assembly positioned within the shell.

11 Claims, 10 Drawing Sheets

Related U.S. Application Data

(60) Provisional application No. 61/493,208, filed on Jun. 3, 2011.

(51) Int. Cl.
*F28F 1/20* (2006.01)
*F28D 1/02* (2006.01)
*B21C 23/00* (2006.01)
*F28F 1/00* (2006.01)

(52) U.S. Cl.
CPC ..... *F28F 2275/125* (2013.01); *Y10T 29/4938* (2015.01); *Y10T 29/49393* (2015.01)

(56) References Cited

U.S. PATENT DOCUMENTS

| | | |
|---|---|---|
| 5,606,792 A | 3/1997 | Schafer |
| 6,155,339 A | 12/2000 | Grapengater |
| 6,247,231 B1 * | 6/2001 | Findlan ................. B23K 26/28 165/76 |
| 6,332,494 B1 | 12/2001 | Bodas et al. |
| 8,069,678 B1 | 12/2011 | Bemert |
| 2009/0049846 A1 | 2/2009 | Jensen |
| 2010/0236766 A1 | 9/2010 | Ulics et al. |

* cited by examiner

VERTICAL BUNDLE AIR-COOLED HEAT EXCHANGER, METHOD OF MANUFACTURING THE SAME, AND POWER GENERATION PLANT IMPLEMENTING THE SAME

CROSS-REFERENCE TO RELATED PATENT APPLICATIONS

This application is a continuation of U.S. patent application Ser. No. 14/123,678 filed Jun. 17, 2014, which is a PCT national phase application in the United States for International Patent Application No. PCT/US2012/040806 filed Jun. 4, 2012, which claims the benefit of U.S. Provisional Patent Application No. 61/493,208 filed Jun. 3, 2011; the entireties of which are incorporated herein by reference.

FIELD OF THE INVENTION

The present invention relates generally to vertical bundle air-cooled heat exchangers, and specifically to vertical bundle air-cooled heat exchangers that act as the condensing unit in a Rankine cycle fluid circuit of a power generation plant.

BACKGROUND OF THE INVENTION

Figure 1:
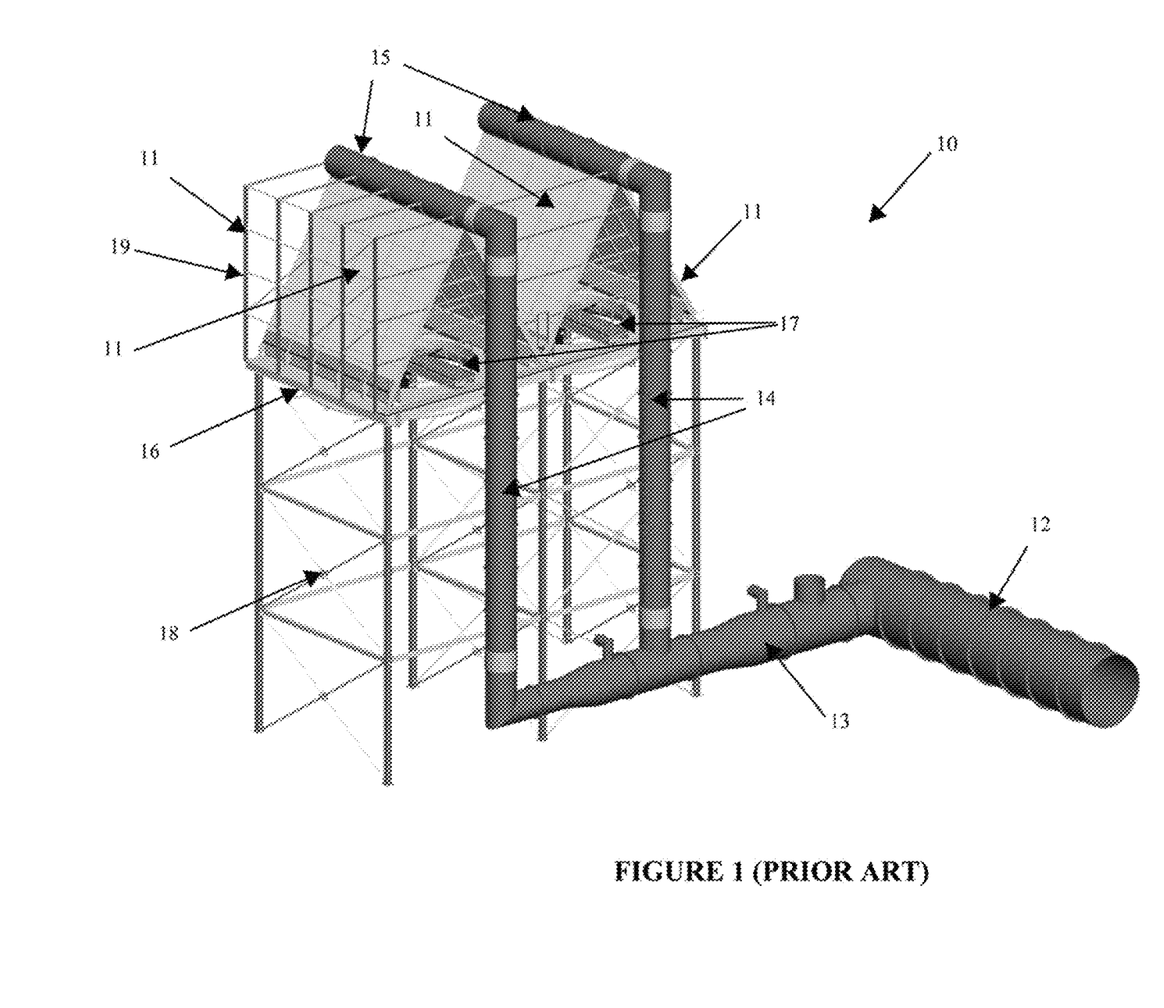
FIG. 1 is a schematic of a prior art air-cooled condenser unit.

Cooling fluid streams by air instead of water is an inherently more environmentally friendly option. Indeed, restriction on water consumption for industrial use, especially to condense waste steam in power plants, has emerged as a growing worldwide problem. Driven by increasing scarcity of water, power plant designers have been turning to air-cooled condensers, such as that which is shown in FIG. 1 in lieu of the conventional water-cooled condensers. Existing air-cooled condensers consist of inclined tube bundles organized in "cells" wherein the turbine exhaust steam flows inside the tubes and is condensed by the flow of cooling air in a cross flow mode delivered by axial fans located underneath. A typical air-cooled condenser unit 10 is shown in FIG. 1 and comprises a plurality of inclined tube bundles 11 arranged in an A-frame structure. A main stem duct 12 delivers steam from a turbine into a distribution manifold 13. The steam passes through the distribution manifold 13 and into the risers 14, where it then flows into the distribution headers 15. The distribution headers 15 deliver the steam into the inclined tube bundles 11 where thermal energy from the steam is transferred to air flowing on the outside of the inclined tube bundles 11. The tube bundles 11 are positioned atop a fan deck platform 16 that comprises a plurality fans 17 for forcing cooling air to flow adjacent and through the inclined tube bundles 11. The fan deck platform may be situated atop a frame 18 so that cooling air can be drawn upward. A windwall structure 19 may also be provided.

Prior art air-cooled condenser configurations have several disadvantages that have limited its wide application, such as: (1) high capital cost; (2) large land area requirement; (3) significant site construction effort; and (4) contamination of condensate (deleterious iron carry over) by corrosion of the carbon steel tubing and associated reduction in the service life of the system.

Thus, a need for an improved air-cooled heat exchanger, and improved finned tubes for use with the same, exists.

SUMMARY OF THE INVENTION

In one embodiment, the invention can be a method of forming a finned tube for an air-cooled condenser, the method comprising: extruding, from a first material, a first finned tube section comprising: a first tube having an inner surface forming a first cavity along a first longitudinal axis and an outer surface; and a first plurality of fins protruding radially outward from the outer surface of the first tube, the first plurality of fins integral with the first tube and extending substantially parallel to the first longitudinal axis.

In another embodiment, the invention can be a method of forming a finned tube for an air-cooled condenser, the method comprising: providing a finned tube section comprising: an outer tube having an inner surface forming a cavity along a longitudinal axis and an outer surface; and a plurality of fins protruding radially outward from the outer surface of the outer tube, the outer tube formed of a first material; inserting an inner tube having an outer surface through the cavity of the outer tube, the inner tube having an inner surface forming a cavity; and expanding the inner tube so that the outer surface of the inner tube is in contact with the inner surface of the outer tube, the inner tube formed of a second material that is different than the first material.

In yet another embodiment, the invention can be a method of forming a finned tube for an air-cooled condenser, the method comprising: forming a plurality of finned tube sections, each of the finned tube sections comprising: a tube having an inner surface forming a cavity along a longitudinal axis and an outer surface; and a plurality of fins protruding radially outward from the outer surface of the tube; aligning the plurality of finned tube sections so that the longitudinal axes are in axial alignment and the plurality of fins of adjacent finned tube sections are angularly offset from one another; and coupling the plurality of finned sections together.

In still another embodiment, the invention can be a method of forming a tube bundle assembly for an air-cooled condenser comprising: forming a plurality of finned tubes in accordance with one of the methods described in the three paragraphs immediately preceding above; arranging the plurality of finned tubes in a substantially vertical and side-by-side orientation; coupling a top end of the outer tube of each of the plurality of finned tubes to a top header pipe and coupling a bottom end of the outer tube of each of the plurality of finned tubes to a bottom header pipe; wherein a hermetic fluid path is formed through the cavity of the inner tube of each of the plurality of finned tubes from an inlet header cavity of the top header pipe to an outlet header of the bottom header pipe.

In even another embodiment, the invention can be a method of condensing steam in a power generation plant comprising: introducing steam into the inlet header cavity of the tube bundle assembly formed by the method described in the immediately preceding paragraph, the steam flowing downward through the hermetic fluid paths of the plurality of finned tubes; flowing air upward along the plurality of finned tubes of the tube bundle assembly, thermal energy being transferred from the steam to the air through the plurality of finned tubes, thereby condensing the steam; and condensate gathering in the outlet header cavity of the bottom header pipe.

In a further embodiment, the invention can be a finned tube for an air-cooled condenser comprising: an extruded first finned tube section comprising: a first tube having an inner surface forming a first cavity along a first longitudinal axis and an outer surface; and a first plurality of fins protruding radially outward from the outer surface of the first tube, the first plurality of fins integral with the first tube and extending substantially parallel to the first longitudinal axis; and wherein the extruded finned section is formed of a first material.

In a yet further embodiment, the invention can be a finned tube for an air-cooled condenser comprising: an outer tube having an inner surface forming a cavity along a longitudinal axis and an outer surface; a plurality of fins protruding radially outward from the outer surface of the outer tube, the outer tube formed of a first material; an inner tube extending through the cavity of the outer tube, the inner tube having an inner surface forming a cavity and an outer surface, the outer surface of the inner tube being in contact with the inner surface of the outer tube, the inner tube formed of a second material that is different than the first material.

In a still further embodiment, the invention can be a finned tube for an air-cooled condenser comprising: a plurality of finned tube sections, each finned tube section comprising: an outer tube having an inner surface forming a cavity along a longitudinal axis and an outer surface, the outer tube formed of a first material; and a plurality of fins protruding radially outward from the outer surface of the outer tube; and an inner tube extending through the cavities of the outer tubes to couple the plurality of finned tube sections together, the inner tube having an inner surface forming a cavity and an outer surface, the outer surface of the inner tube being in contact with the inner surfaces of the outer tubes, the inner tube formed of a second material that is different than the first material.

In an even further embodiment, the invention can be a finned tube for an air-cooled condenser comprising: a plurality of finned tube sections, each finned tube section comprising: an outer tube having an inner surface forming a cavity along a longitudinal axis and an outer surface, the outer tube formed of a first material; and a plurality of fins protruding radially outward from the outer surface of the outer tube; and the plurality of finned tube sections coupled together in a manner so that the longitudinal axes are in axial alignment and the plurality of fins of adjacent finned tube sections are angularly offset from one another.

In other embodiments, the invention can be a tube bundle assembly for an air-cooled condenser comprising: a plurality of finned tubes in accordance with any one of the immediately preceding four paragraphs, the plurality of finned tubes arranged in a substantially vertical and side-by-side orientation; a top end of each of the plurality of finned tubes coupled to a top header pipe and a bottom end of each of the plurality of finned tubes coupled to a bottom header pipe; and wherein a hermetic fluid path is formed through each of the plurality of finned tubes from an inlet header cavity of the top header pipe to an outlet header of the bottom header pipe.

In yet another embodiment, the invention can be a power generation plant comprising: at least one tube bundle assembly according to the immediately preceding paragraph, the top header pipe operably coupled to a source of steam generated during a power generation cycle; and a blower for flowing air upward along the plurality of finned tubes of the tube bundle assembly In a still further embodiment, the invention can be an air-cooled condenser comprising: at least one tube bundle assembly comprising: a tube bundle comprising a plurality of finned tubes arranged in a substantially vertical and side-by-side orientation, each of the plurality of finned tubes comprising a cavity; a top header pipe comprising an inlet header cavity operably coupled to a source of steam; a bottom header pipe comprising an outlet header cavity for collecting condensate; wherein top ends of the plurality of finned tubes are coupled to the top header pipe and the bottom ends of the plurality of finned tubes are coupled to the bottom header pipe; and the top header pipe having a transverse cross-section having a minor axis and a major axis, the minor axis of the transverse cross-section of the top header pipe extending substantially horizontal.

In another embodiment, the invention can be a vertical bundle air-cooled condenser comprising: at least one tube bundle assembly comprising: a tube bundle comprising a plurality of finned tubes arranged in a substantially vertical and side-by-side orientation, each of the plurality of finned tubes comprising a cavity; a top header pipe comprising an inlet header cavity operably coupled to a source of steam; a bottom header pipe comprising an outlet header cavity for collecting condensate; top ends of the plurality of finned tubes coupled to the top header pipe and the bottom ends of the plurality of finned tubes coupled to the bottom header pipe; and a shell having an open top end and open bottom end, the at least one tube bundle assembly positioned within the shell.

In even another embodiment, the invention can be a power generation plant comprising: the vertical bundle air-cooled condenser according to any one of the two immediately paragraphs; and wherein the vertical bundle air-cooled condenser forms part of a Rankine cycle fluid circuit for producing power.

In a further embodiment, the invention can be an air-cooled condenser comprising: at least one tube bundle assembly comprising: a tube bundle comprising a plurality of finned tubes arranged in a substantially vertical and side-by-side orientation, each of the plurality of finned tubes comprising a cavity; a top network of pipes operably coupled to a source of steam; a bottom network of pipes for collecting condensate; wherein top ends of the plurality of finned tubes are coupled to the top network of pipes and the bottom ends of the plurality of finned tubes are coupled to the bottom network of pipes; and the top network of pipes and the bottom network of pipes having one or more pipes having a transverse cross-section having a minor axis and a major axis, the minor axis of the transverse cross-section of the top header pipe extending substantially horizontal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE DRAWINGS

The following description of the illustrated embodiment(s) is merely exemplary in nature and is in no way intended to limit the invention, its application, or uses.

Figure 2:
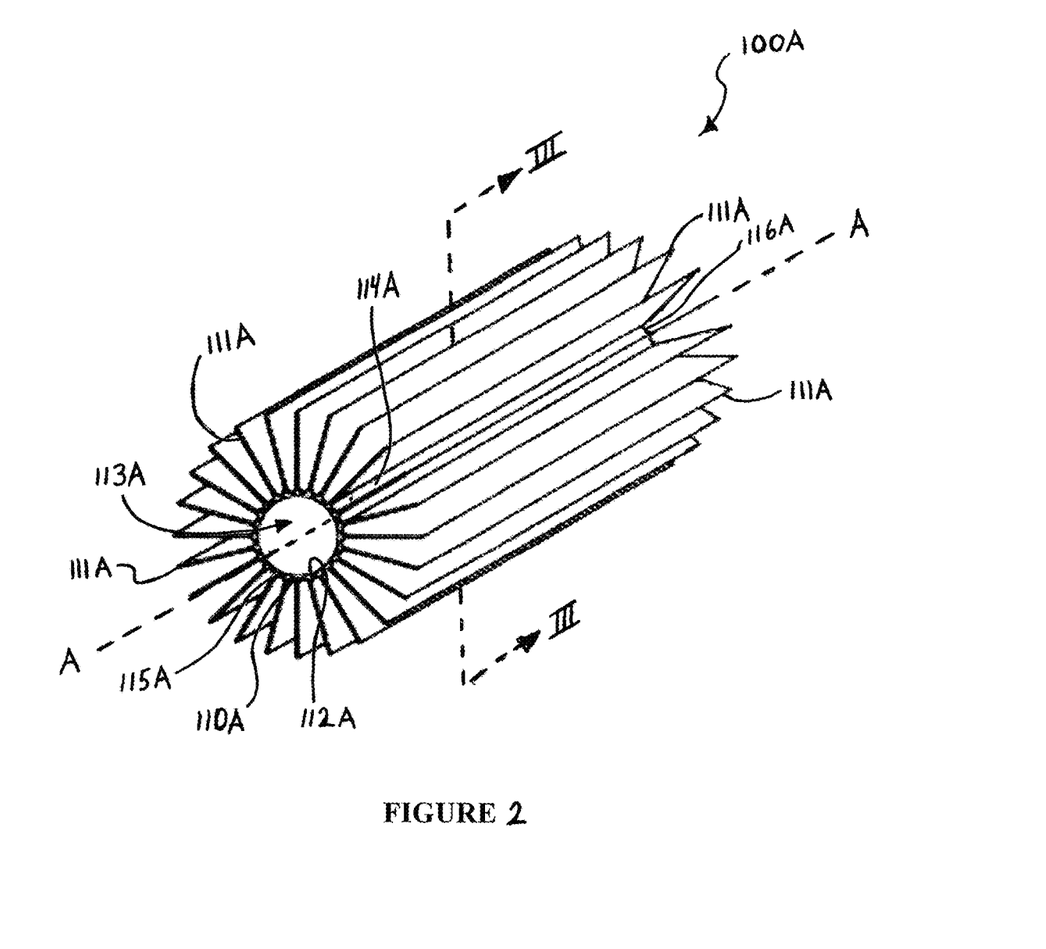
FIG. 2 is a perspective view of an extruded find tube section according to an embodiment of the present invention.
Figure 3:
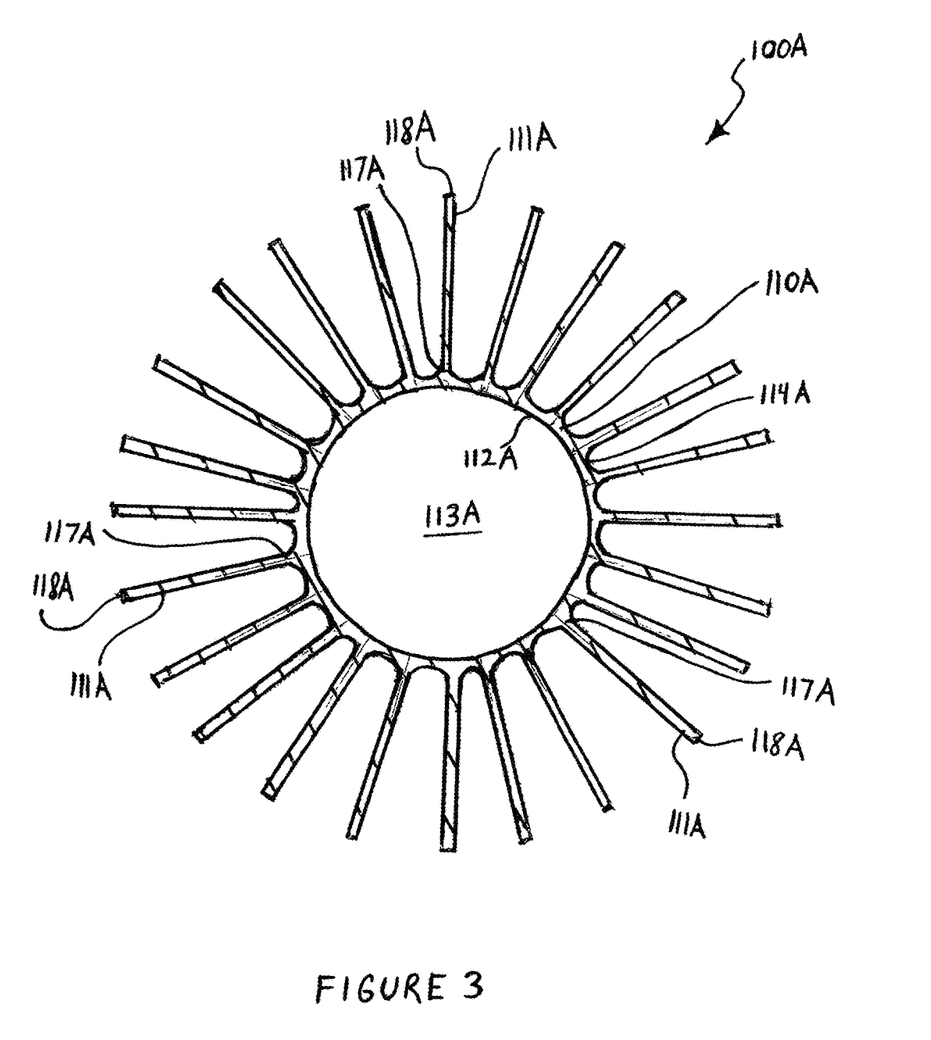
FIG. 3 is a transverse cross-section of the extruded find tube section of FIG. 2 taken along view III-III.

Referring first to FIGS. 2 and 3 concurrently, a finned tube section 100A according to an embodiment of the present invention is exemplified. The finned tube section 110A extends from a first end 115A to a second end 116A along a longitudinal axis A-A. In the exemplified embodiment, the finned tube section 100A is an elongated tubular structure that is substantially linear and particularly suitable for creating a vertical tube bundle for an air-cooled condenser of a power generation plant. As discussed below, in certain embodiments, a plurality of the finned tube sections 100A can be formed and coupled together in axial alignment to form a single finned tube. In one such embodiment, the finned tube sections 100A have a length between 4 to 8 feet and are installed vertically in such sections. The invention, however, is not so limited and, in certain embodiment, the finned tube section 100A can be formed of a sufficient length such that a single finned tube section 100A forms a single finned tube. In such an embodiment, the first end 115A of the finned tube section 100A will be the top end of the finned tube while the second end 116A of the finned tube section 100A will be the bottom end of the finned tube (or vice versa). As discussed below, the finned tube section 100A is a heat exchange tube in that it effectively transfers thermal energy from a tube-side fluid, such as steam, that is flowing inside of the finned tube section 100A to a shell-side fluid, such as air, that is flowing adjacent the finned tube section 100A on the exterior thereof.

The finned tube section 100A generally comprises a tube 110A and a plurality of fins 111A extending radially outward from the tube 110A. The tube 110A comprises an inner surface 112A that forms a cavity 113A and an outer surface 114A from which the plurality of fins 111A protrude/extend. The cavity 113A extends along a longitudinal axis A-A. In certain embodiments (i.e., embodiment in which an inner tube is not needed), the cavity 113A acts as a tube-side fluid path in which the inner surface 112A is exposed to the tube-side fluid. In embodiments in which an inner tube is used (described later with respect to FIGS. 8-11), the tube 110A can be considered an outer tube, the inner surface 112A of which is not exposed to the tube-side fluid (such as steam generated in a Rankine power cycle). In the exemplified embodiment, the tube 110A has a substantially circular transverse cross-section.

The tube 110A also comprises an outer surface 114A. The plurality of fins 111A protrude radially outward from the outer surface 114A of the tube 110A. In one embodiment, the finned tube section 100A is formed by an extrusion process. As a result, the plurality of fins 111A are integral with the tube 110A. More specifically, in one such embodiment, both the tube 110A and the plurality of fins 11A are simultaneously formed in a single extrusion process using a first material, such as an extrudable metal or metal alloy. In one specific embodiment, the finned tube section 100A (including both the plurality of fins 111A and the tube 110A) are formed of a material having a coefficient of thermal conductivity. Suitable materials include, for example, aluminum or aluminum alloy. The utilization of an extruded finned tube section 100A allows for the compaction and simplification of the overall heat exchanger, as compared with the state of the art cross flow designs.

While forming the entirety of the finned tube section 100A by a single extrusion step is preferred in certain embodiments, the invention is not so limited in other embodiments. In certain other embodiments, the tube 110A may be extruded in one step and the fins 11A may be extruded subsequently or prior thereto during a separate step, and then subsequently coupled (directly or indirectly) to the tube 110A through brazing, welding, thermal fusion, mechanical coupling, or other processes. In still other embodiments, the tube 110A and the fins 111A can be formed separately by techniques other than extrusion, such as machining, bending, pressing, die-cutting, stamping, and/or combinations thereof.

In the exemplified embodiment, each of the plurality of fins 111A extends substantially parallel with the longitudinal axis A-A and covers the entire length of the tube 110A, wherein the length is measured from the first end 115A to the second end 116A. Moreover, each of the plurality of fins 111A extends radially outward from the outer surface 114A of the tube 110A in a linear fashion from a base portion 117A to a distal end 118A. The base portions 117A can be thicker than the remaining portions of the fins 11A, thereby promoting stability and conductive heat transfer into the fins 111A. In the illustrated embodiment, the fins 111A are linear in their longitudinal extension. However, in alternate embodiments, the fins 111A may be extruded or otherwise formed with an undulating (wave) geometry to promote heat transfer.

As can best be seen in FIG. 3, the plurality of fins 111A are arranged about the circumference of the outer surface 114A of the tube 110A at uniform angular intervals. In the illustrated embodiment, the twenty four (24) fins 111A are provided on the tube 110A so that an angular interval of approximately 15° exists between adjacent fins 111A. Of course, the exact number of fins 111A, along with the angular spacing between them can vary as needed. For example, depending on the diameter of the tube 110A and the heat duty demand, the number and height of the radial fins 111A can be selected. The tube 110A can have as many radial fins 111A as the state of the art extrusion technology will allow. In one exemplary embodiment, providing 24 fins 111A on a 1.5 inch nominal ID tube 110A, wherein each fin 111A is 1.5 inch high has been determined to be feasible. A larger number of fins may be achieved if a larger size tube is selected.

Figure 4:
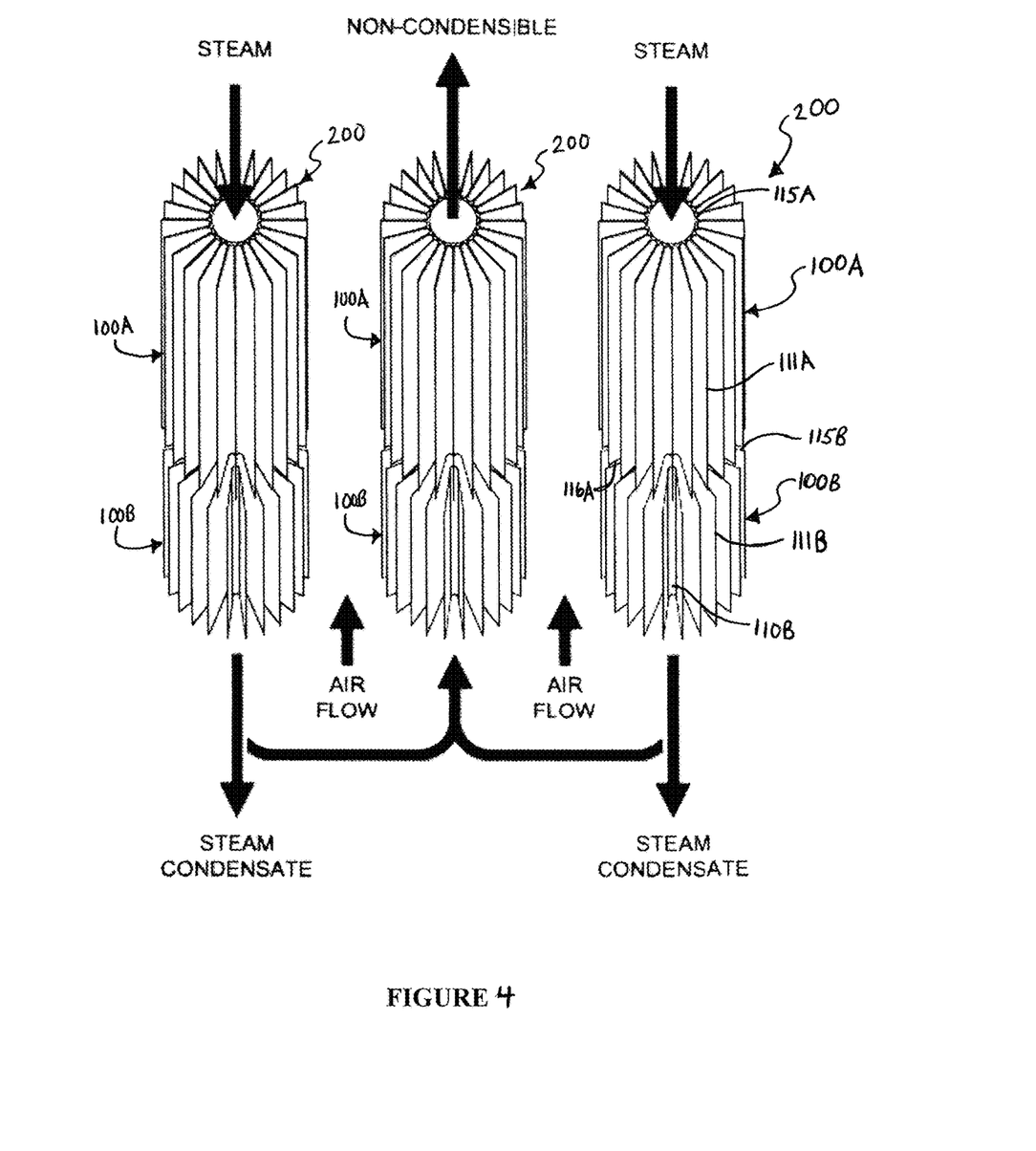
FIG. 4 is a perspective view of three finned tubes, each of the finned tubes formed by a plurality of the finned tube sections of FIG. 2 according to an embodiment of the present invention.

Referring now to FIG. 4, the formation of a finned tube 200 using a plurality of the finned tube sections 100A-B according to an embodiment of the present invention will be described. FIG. 4 illustrates three of these finned tubes 200, which are identical for the formation and structural purposes described herein, despite their different functionality when incorporated into a tube bundle. The arrows indicating steam flow in the finned tubes 200 results from the arrangement shown in FIGS. 5-6, which will be described later in this document. For purposes of simplicity, only one of the finned tubes 200 will be described with the understanding that the discussion is applicable to all of the finned tubes 200 in FIG. 4 and/or used to form a tube bundle according to the present invention.

As exemplified, the finned tube 200 comprises two finned tube sections 100A, 100B. Finned tube section 100A is described above with reference to FIGS. 2-3, and is referred to herein as a first finned tube section 100A. Finned tube section 100B (only a portion of which is shown in FIG. 4) is identical to finned tube section 100A in all aspects but is either subsequently or previously formed using one of methods discussed above. The finned tube section 100B is referred to herein as the second finned tube section 100B. Like numbers are used to like parts of the first and second finned tube sections 100A, 100B with the exception that the suffix "B" is used to denote the parts of the second finned tube section 100B rather than the suffix "A," which is used in FIGS. 2-3 to describe the first finned tube section 100A.

As mentioned above, the finned tube 200 comprises a first finned tube section 100A and a second finned tube section 100B arranged in axial alignment. The first finned tube section 100A and the second finned tube section 100B are aligned adjacent one another so that the longitudinal axes A-A of the first and second finned tube sections 100A, 100B are substantially aligned and coaxial. When so aligned, the first end 115B of the second tube 110B of the second finned tube section 100B abuts the second end 116A of the first tube 110A of the first finned tube section 100A.

While the first and second finned tube sections 100A, 100B are aligned so that their longitudinal axes A-A are aligned, the first and second finned tube sections 100A, 100B (which are adjacent finned tube sections in the finned tube 200) are rotated relative to one another so that corresponding ones of their fins, 111A, 111B are angularly offset from one another. This can improve heat transfer from the tube-side fluid (e.g., steam) to the shell-side fluid (e.g., air). The angular offset, in one embodiment is 1° to 20°. In another embodiment, the angular offset is 5° to 10°.

This concept will be described below with respect to an example to ensure understanding. Assume that the first finned tube section 100A was placed in proper alignment and position in an angular/rotational position in which one of its fins 111A were angularly located at each of the cardinal points (N, S, E, & W). The second finned tube section 100B would then be position in axial alignment with the first finned section 100A in an angular/rotational position in which none of its fins 111B were located at the cardinal points. Rather, the second finned section 100B would be in an angular/rotational position in which one of its fins 111B is offset from each of the cardinal points by the angular offsets described above, such as for example 5° to 10°. In alternate embodiments, however, the fins 111A, 111B of the first and second finned sections 100A, 100B may be angularly aligned if desired.

Once the first finned tube section 100A and second finned tube section 100B are aligned and rotationally oriented as described above, the first and second finned tube sections 100A, 100B are coupled together, thereby forming the finned tube 200. The exact technique used to couple, either directly or indirectly, the first finned tube section 100A and second finned tube section 100B together will depend on the material(s) of which the first finned tube section 100A and second finned tube section 100B are constructed. Suitable connection techniques include mechanical fastening in which gaskets or other materials can be used achieve a hermetic interface, welding, brazing, thermal fusing, threaded connection, use of a coupler sleeve, a tight-fit connection, and/or combinations thereof. As described below with respect to FIGS. 8-10, coupling of the first and second finned tube sections 100A, 100B can also be accomplished using an inner tube.

While the finned tube 200 is exemplified as having only two finned tube sections 100A, 100B, the finned tube 200 can be formed of more or less finned tube sections 100A as desired. In embodiments of the finned tube 200 in which more than two finned tube sections 100A, 100B are used, the aforementioned rotational offset can be implemented between each pair of adjacent finned tube sections.

Figure 5:
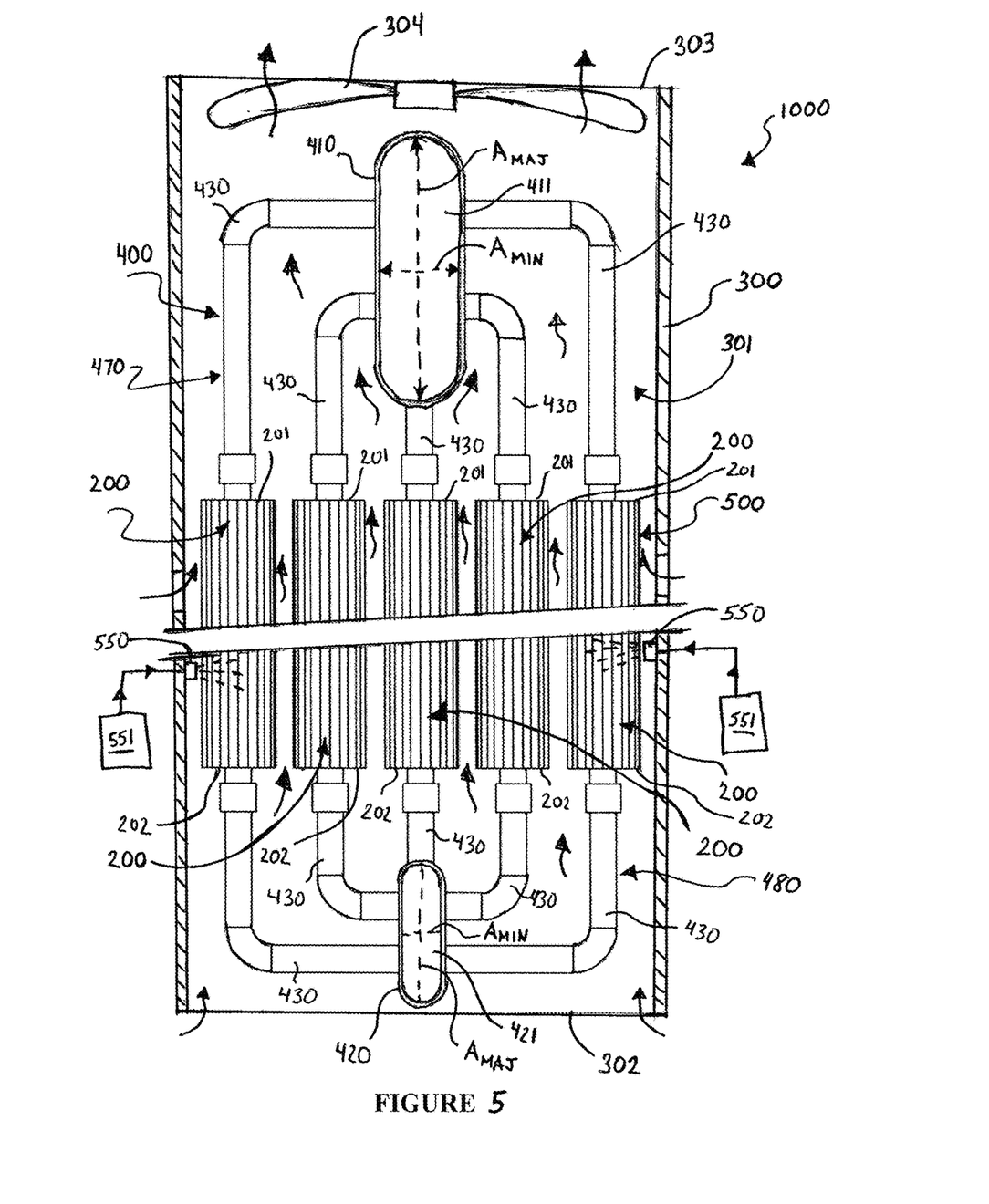
FIG. 5 is a schematic of an air-cooled condenser comprising a tube bundle assembly according to an embodiment of the present invention positioned within a shell and coupled to a source of steam generated in a Rankine cycle of a power generation plant.

Referring now to FIG. 5, an air-cooled condenser 1000 according to an embodiment of the present invention is illustrated. The air-cooled condenser 1000 is a true counter-current/parallel flow air-cooled condenser that, in one embodiment, is constructed with the finned tubes 200 formed of extruded aluminum or aluminum alloy finned tube section 100A, 100B in a vertical array (or matrix) configuration.

The air-cooled condenser 1000 generally comprises a shell 300 and a tube bundle assembly 400. The tube bundle assembly 400 is positioned within an internal cavity 301 of the shell 300. The shell 300 has an open top end 302 and an open bottom end 303 As a result, cool air can flow into the open bottom end 302, flow through the internal cavity 301 where it flows adjacent the finned tubes 200 and becomes warmed, and exists the shell 300 as warmed air. A blower 304, in the form of a fan or other mechanism capable of inducing air flow, can be provided either above and/or below the tube bundle assembly 400. While a single blower 304 is illustrated, more blowers can be implemented as desired to meet functional demands. In other embodiments, the blower may be omitted.

The tube bundle assembly 400 generally comprises a tube bundle 500 formed by a plurality of the finned tubes 200, a top header pipe 410, a bottom header pipe 420, and a plurality of feeder pipes 430. Each of the plurality of the finned tubes 200 of the tube bundle 500 are oriented in a substantially vertical orientation so that the longitudinal axes A-A (FIG. 2) thereof extend substantially vertical. The finned tubes 200 of the tube bundle 500 may be arrayed in a triangular, rotated triangular, rectangular or another suitable layout that provides for a uniformly distributed flow area across the tube bundle. In the exemplified embodiment, the finned tubes 200 of the tube bundles 500 are arrayed in 3×5 rectangular arrays (see FIG. 6). A desired feature of the tube bundle layout geometry is the ability to make a closely packed bundle of the finned tubes 200 such that the air flowing axially along the finned tubes 200 is in close proximity to the finned tubes' 200 outer surfaces. Factory assembled modules can be delivered and connected into the steam distribution network of a Rankine cycle fluid circuit of a power generation planet, thereby providing an economical heat rejection alternative for small and large scale applications.

Each of the finned tubes 200 of the tube bundle 500 is coupled to and fed steam from the top header pipe 410, which is in turn operably coupled to a source of steam, such as turbine in a Rankine cycle power generation circuit. Similarly, each of the finned tubes 200 of the tube bundle 500 is coupled to the bottom header pipe 420 so that condensate can gather and be fed back into the Rankine cycle fluid circuit of the power generation plant. In the exemplified embodiment, a top end 201 of each of the finned tubes 200 of the tube bundle 500 is fluidly coupled to the top header pipe 410 by a separate upper feeder pipe 430. Similarly, a bottom end 202 of each of the finned tubes 200 of the tube bundle 500 is fluidly coupled to the bottom header pipe 420 by a separate lower feeder pipe 430. As a result, a hermetic fluid path is formed through the cavity 113A (FIG. 2) of each of the finned tubes 200 from the inlet header cavity 411 of the top header pipe 410 to the outlet header cavity 421 of the bottom header pipe 420. The top header pipe 410 is located at an elevation that is greater than the elevation at which the bottom header pipe 420 is located. The top header pipe 410 and the upper feeder pipes 430 can be collectively considered a top network of pipes 470 while the bottom header pipe 420 and lower feeder pipes 430 can be collectively considered a bottom network of pipes 480.

The top header pipe 410 extends along a longitudinal axis B-B (FIG. 5) that is substantially horizontal. Similarly, the bottom header pipe 420 also extends along a longitudinal axis that is substantially horizontal. In other embodiments, the top and bottom header pipes 410, 420 may be inclined.

The top header pipe 410 is located above the tube bundle 500 while the bottom header pipe 420 is located below the tube bundle 500. The top and bottom header pipes 410, 420, however, are specifically designed so as to create minimal impedance and/or obstruction to the vertical flow of air entering and exiting the tube bundle 500. In order to accomplish this, each of the top and bottom header pipes 410, 420 is designed to have a transverse cross-section having a major axis $A_{MAJ}$ and a minor axis $A_{MIN}$. Moreover, each of the top and bottom header pipes 410, 420 is oriented so that the minor axis $A_{MIN}$ extends substantially perpendicular to the direction of the air flow through the tube bundle 500. Thus, in the exemplified embodiment, the minor axis $A_{MIN}$ extends substantially horizontal while the major axis $A_{MAJ}$ extend substantially vertical. The major axis $A_{MAJ}$ has a length that is larger than the length of the minor axis $A_{MIN}$ for both the top and bottom header pipes 410, 420. In one such embodiment, the major axis $A_{MAJ}$ has a length that is at least twice the length of the minor axis $A_{MIN}$ for both the top and bottom header pipes. By designing and orienting the transverse cross-sections of the top and bottom header pipes 410, 420 to have the aforementioned major axis $A_{MAJ}$ and minor axis $A_{MIN}$, the top and bottom header pipes 410, 420 achieve two criteria: (1) adequate flow area for the tube side fluid; and (2) maximum opening between the adjacent headers to minimize friction loss to the entering (bottom header) and exiting (top header) air (see FIG. 6 also). While not visible from the drawings, each of the horizontal sections of the feeder pipes 430 may also be designed to have a transverse cross-section comprising a major axis $A_{MAJ}$ and a minor axis $A_{MIN}$, and be oriented, as discussed above and below with respect to the top and bottom headers 410, 420.

In one embodiment, the top and bottom header pipes 210, 220 (along with the horizontal sections of the feeder pipes 430) each have an obround transverse cross-section. The obround shape allows for a large internal flow area for steam while affording ample space for the air to enter and exit the tube bundle 500 via spaces between the header pipes 410, 420 (and horizontal sections of the feed pipes 430). The obround transverse cross section with the flat (long) sides vertical is a preferred arrangement when the tube side fluid is low pressure steam or vapor. As mentioned above, the top header pipe 510 serves as the inlet for the vapor (exhaust steam) (see FIG. 3 for a typical inlet header profile).

Figure 6:
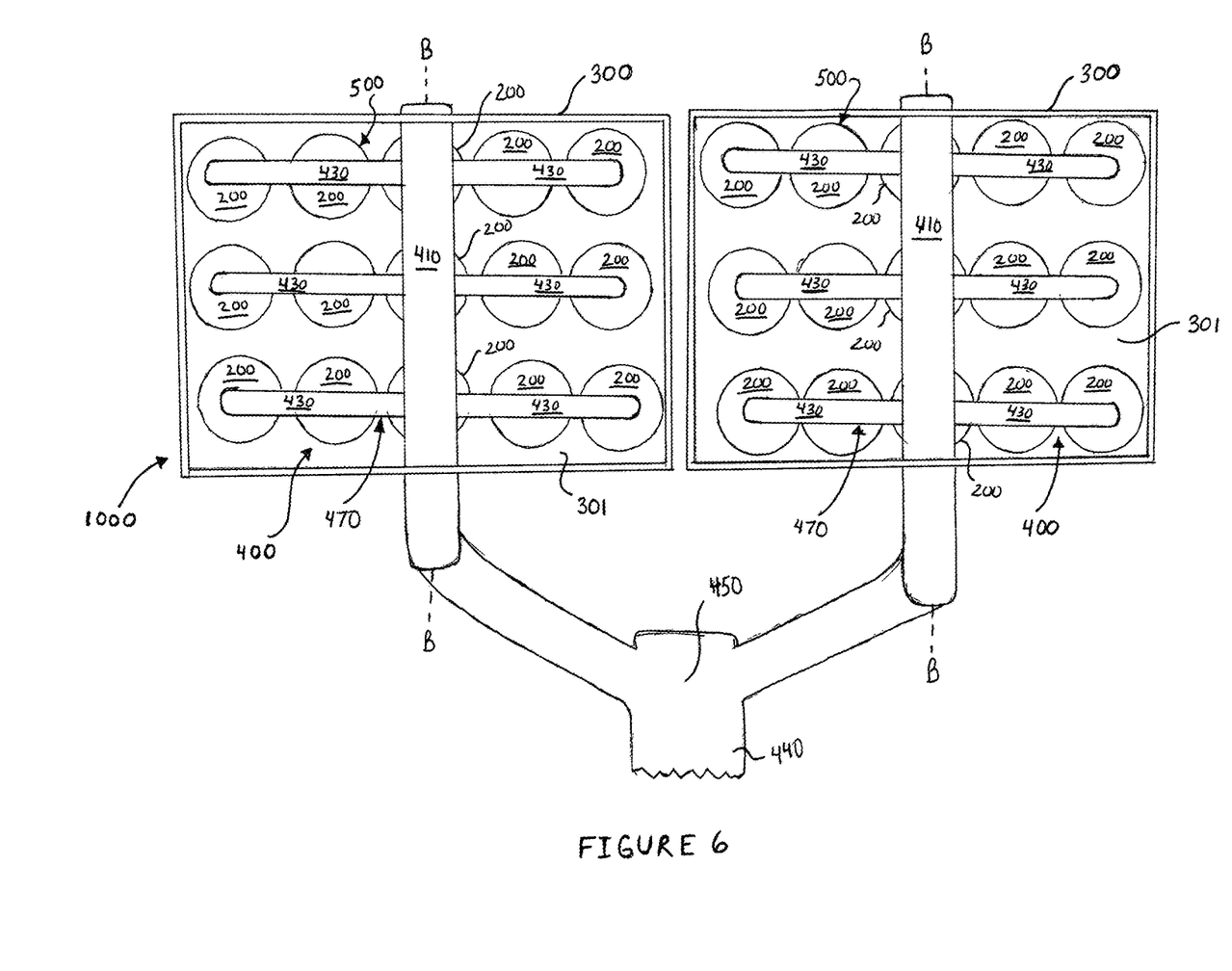
FIG. 6 is a top view of the air-cooled condenser of FIG. 5 wherein multiple tube bundle assemblies are shown coupled to an inlet manifold at a single point or juncture.

As can be seen in FIG. 6, the air-cooled condenser can comprises a plurality of tube bundles 500 housed in separate shells 300. In other embodiments, more than one tube bundle 500 can be housed in a single shell 300. All of the inlet header pipes 410 are preferably manifolded from a single point 450 of a main steam supply line 440. Furthermore, each of the tube bundles 500, along with the shell 300 may be positioned atop a fan deck, which is in turn positioned atop a frame structure (as shown in FIG. 1).

Referring back to FIG. 5, the up flowing cooling air may be sprayed with a mist of coolant generated by spray nozzles 550 located within the shell 300 at a height between the top header pipe 410 and the bottom header pipe 420. The spray nozzles 550 are operably and fluidly coupled to coolant reservoirs 551 and further configured to atomize the liquid coolant into a fine mist that is introduced into the air flowing through the tube bundles 500. Spaying the mist into the air flow at intermediate height(s) increases the LMTD and promotes heat rejection from the tube side fluid (i.e. the steam). This form of cooling augmentation is unique to this heat exchanger design and results in substantial performance gains of 25 to 30% depending on the ambient conditions. These performance gains can be realized in improved warm weather performance or capital cost reduction and smaller plot area constraints.

Figure 7:
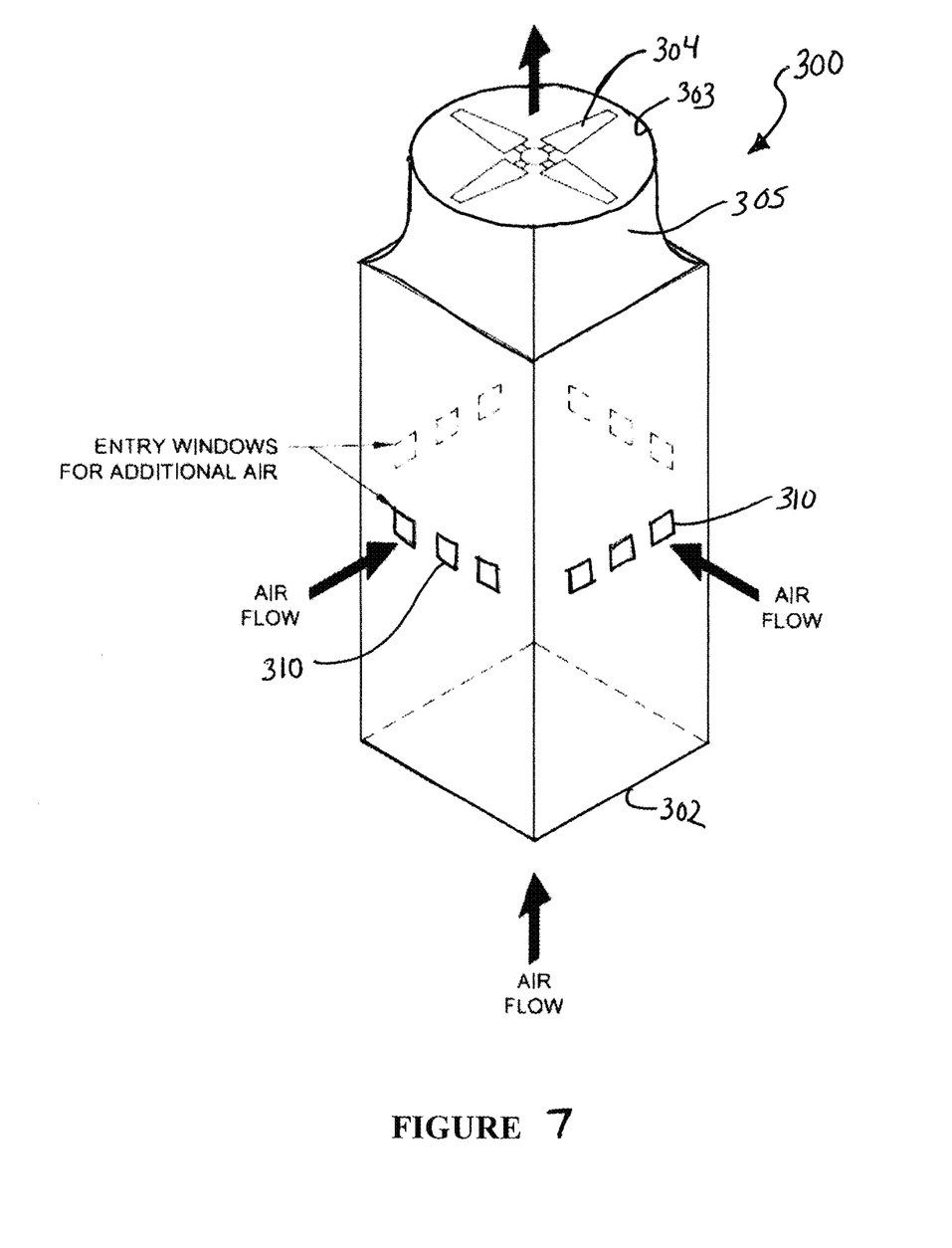
FIG. 7 is a perspective view of a shell according to an embodiment of the present invention.

Referring now to FIG. 7, a housing 300 suitable for use in the air-cooled condenser 1000 of FIGS. 5 and 6 is illustrated. Depending on the available height, a "chimney" space 305 above the bundle can be incorporated in the unit to increase the natural draft height. This will reduce the amount of electrical energy required to pump the cooling air through the bundle. In designs where the blower 304 is located above the tube bundle 500, it is possible to provide for additional entry windows 310 for air to enter the tube bundle 500, which will promote increased heat transfer from the tube-side fluid.

Figure 8:
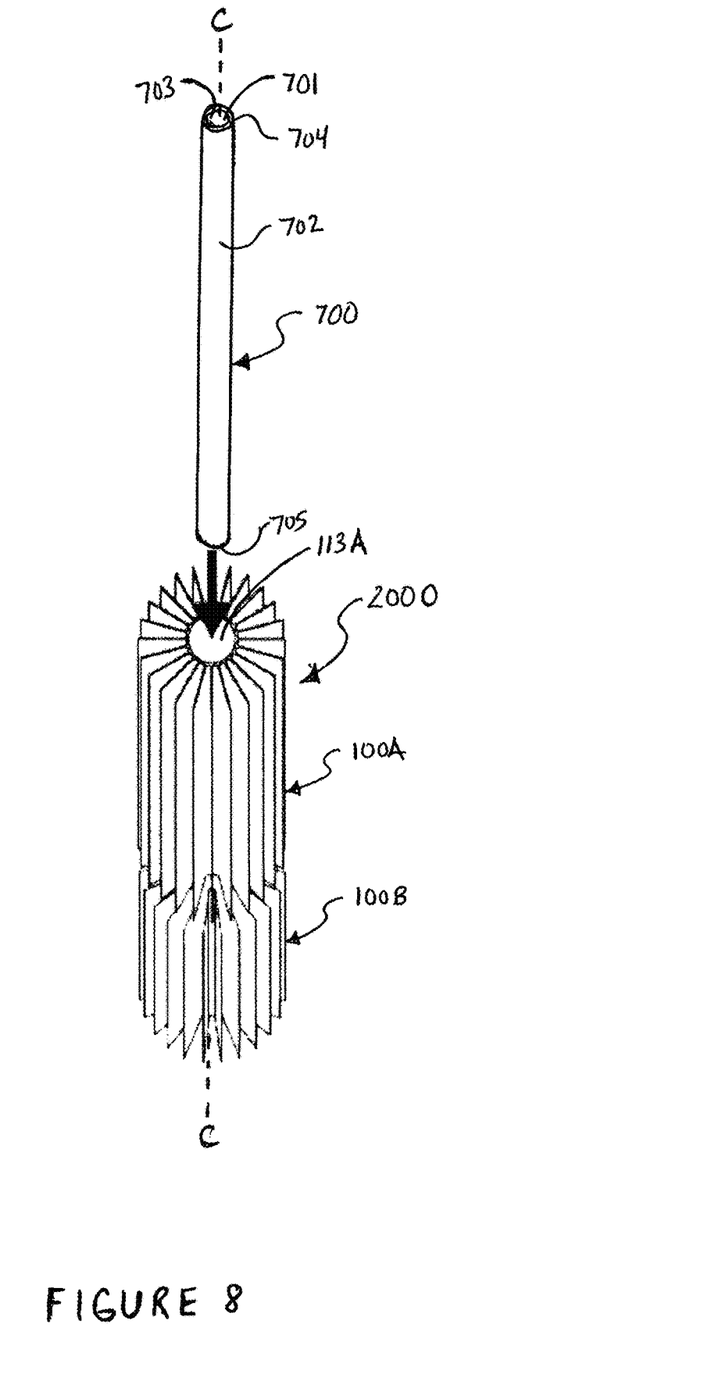
FIG. 8 is a perspective view of an inner tube being slid into two finned tube sections during an initial step of a finned tube formation method according to another embodiment of the present invention.
Figure 9:
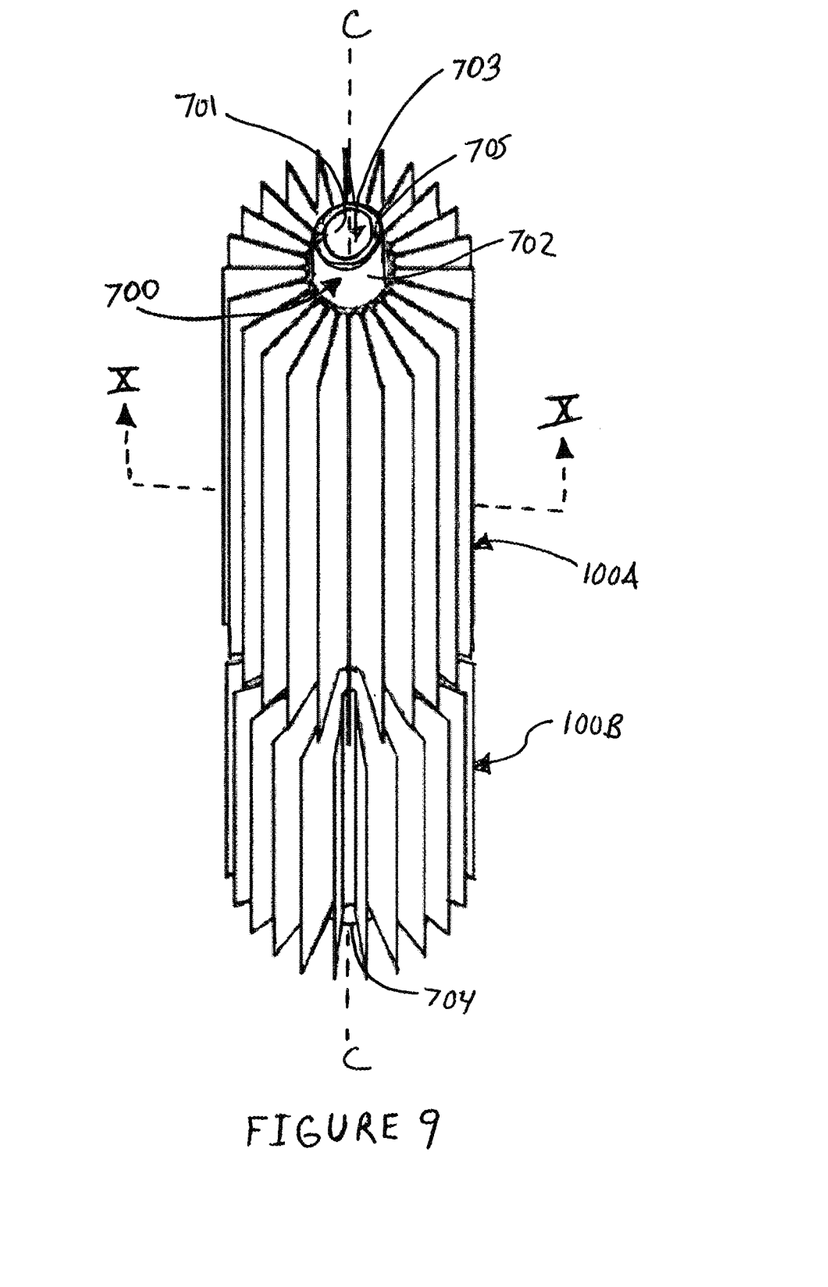
FIG. 9 is a perspective view of the inner tube extending through the two finned tube sections during a subsequent step of a finned tube formation method according to another embodiment of the present invention.
Figure 10:
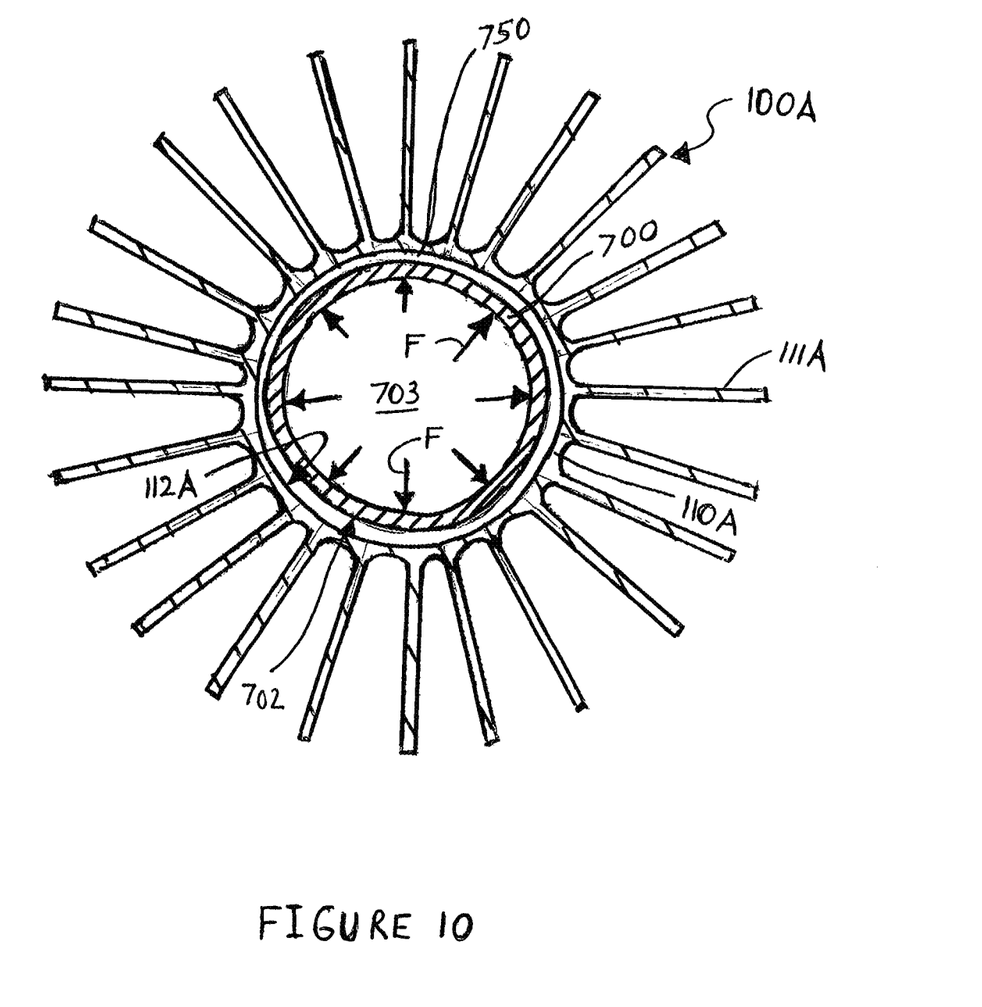
FIG. 10 is a transverse cross-section of the finned tube assembly of FIG. 9 taken along view X-X, wherein the inner tube has not yet been expanded.

Referring now to FIGS. 8-10, an alternative construction of the finned tube 2000 is described in which the final finned tube 2000 comprises the finned tube sections 100A, 100B and an inner tube 700. Such an arrangement is particularly useful in power plants where the condensing steam is not permitted to come in contact with aluminum or aluminum alloy of the finned tube sections 100A, 100B. The finned tube 2000 can be sued in the air-cooled condenser 1000 described above in lieu of or in addition to the finned tubes 200.

Referring first to FIG. 8, the first and second finned tube sections 100A, 100B are formed, aligned and oriented as described above with respect to FIGS. 2-4. Once this is done, an inner tube 700 is provided and axially aligned with the cavities 113A, 113B of the first and second finned tube sections 100A, 100B along a longitudinal axis C-C. The inner tube 700 is formed of a material that is different than the material of which the first and second finned tube sections 100A, 100B are formed. In one embodiment, the inner tube 700 is formed of a material having a high yield strength, is non-corrosive, and is weldable. A suitable material includes steels, with stainless steel being preferred.

The inner tube 700 extends along an axis has an outer surface 702 and inner surface 701, which forms cavity 703. The inner tube 700 extends from a bottom end 705 to a top end 704 along the longitudinal axis C-C.

Referring now to FIGS. 9 and 10 concurrently, the inner tube 700 is then slid through the cavities 113A, 113B of the finned tube sections 100A, 100B. In the exemplified embodiment, the top end 704 of the inner tube 700 protrudes slightly from the top end of the first finned tube section 100A while the bottom end 705 of the inner tube 700 protrudes slightly from the bottom end of the second finned tube section 100B (FIG. 9). At this stage, the outer diameter of the inner pipe 700 is smaller than the inner diameter of the tubes 110A, 110B. As a result, a interstitial space 750 exists between the outer surface 702 of the inner tube 700 and the inner surfaces 112A, 112B of the tubes 110A, 110B.

Once the inner tube 700 is so positioned, the inner tube 700 is diametrically expanded by applying a force F. Diametric expansion of the inner tube can be achieved by a variety of methods, including hydraulic pressure.

The diametric expansion of the inner tube 700 continues until the outer surface 702 of the inner tube 700 is in substantially conformal surface contact with the inner surfaces 112A, 112B of the finned tube sections 100A, 100B, thereby forming the finned tube 2000. As a result the interstitial space 750 disappears and there are substantially no gaps and/or voids between the outer surface 702 of the inner tube 700 and the inner surfaces 112A, 112B of the finned tube sections 100A, 100B. In embodiments using the inner tube 700, the tubes 110A, 110B can be considered outer tubes.

The inner tube 700 couples the finned tube sections 100A, 100B together and thus can be used instead of or in conjunction with the other coupling techniques discussed above for FIG. 4. When the resulting finned tube 2000 is incorporated into the air-cooled condenser 1000, the inner tube 700 can be sued to make the welded joints between the top pipe network 470 and/or the bottom pipe network 460, as shown in FIG. 5. Additionally, when the inner tube 700 is used, the first and second inner tubes 100A, 100B do not have to be in abutment to effectuate coupling. Because the inner tube 700 (in contact with the condensing steam) is at a higher temperature than the finned tube sections 110A, 100B, the risk of the inter-tube interface becoming loose during service is ameliorated.

EXAMPLE

Comparison of a conventional (inclined bundle) air-cooled condenser (FIG. 1) and an air-cooled condenser according to the present invention is set forth below in the following table for the performance of the two design concepts:

|  | Conventional A-Frame ACC | HI-VACC | Percent Difference |
|---|---|---|---|
| Thermal Duty, mmBtu/hr | 860 | 860 | — |
| Condensing Pressure, "HgA | 2.0 | 2.0 | — |
| Ambient Air Temperature, ° F. | 60 | 60 | — |
| Number of Cells Required | 20 | 12 | −40% |
| ACC Plot Area (L × W), ft | 238 × 170 | 240 × 80 | −53% |
| ACC Height, ft | 104 | 79 | −24% |
| Total Extended Heat Transfer Surface, ft² | 8,919,200 | 7,977,250 | −10% |
| Total Fan Shaft Power, kW | 2700 | 2700 | — |

The design concepts disclosed herein can be used in a wide variety of coolers that seek to employ air as the cooling medium. Its application to design air cooled condensers to condense exhaust steam in power plants will lead to reduced cost and reduced land area requirement. Additional advantages of the present invention are: (1) modular installation; (2) reduced site construction effort compared to the A-frame design; (3) significantly reduced quantity of structural steel required to erect the system; and (4) ability to reduce fan power consumption by adding an exhaust stack (chimney) to the design.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A finned tube assembly for an air-cooled condenser, the finned tube assembly comprising:
a first finned tube section having a unitary structure comprising:
a first tube having an inner surface forming a first cavity along a first longitudinal axis and an outer surface; and
a first plurality of external fins protruding radially outward from the outer surface of the first tube, the first plurality of fins integral with the first tube and extending substantially parallel to the first longitudinal axis;
a second finned tube section having a unitary structure comprising:
a second tube having an inner surface forming a second cavity along a second longitudinal axis and an outer surface; and
a second plurality of external fins protruding radially outward from the outer surface of the second tube, the second plurality of fins integral with the second tube and extending substantially parallel to the second longitudinal axis;
wherein the first finned tube section and the second finned tube section are discrete structural elements;
wherein a first end of the first finned section is abutted to a second end of the second finned tube section;
the discrete first finned tube section and the second finned tube section arranged and rotated relative to each other so that the first and second longitudinal axes are in axial alignment and the first and second plurality of fins are angularly offset from one another.

2. The finned tube assembly according to claim 1, wherein the abutting first and second ends of the first and second finned sections being hermetically coupled directly together wherein a hermetic fluid path is formed through the first and second cavities of the first and second tubes.

3. The finned tube assembly according to claim 2, further comprising an inner tube having an outer surface inserted and extending through the first and second cavities, the inner tube being in an expanded state in which the outer surface of the inner tube is in substantially conformal contact with the inner surfaces of the first and second tubes.

4. The finned tube assembly according to claim 3, wherein the inner tube is formed of a second material that is different than a first material from which the first and second tubes are formed.

5. The finned tube assembly according to claim 4, wherein the first material is aluminum or aluminum alloy and the second material is stainless steel.

6. The finned tube assembly according to claim 1, wherein the first and second tubes have a substantially circular transverse cross-section.

7. The finned tube assembly according to claim 1, wherein the first plurality of fins are arranged at uniform angular intervals around the circumference of the first tube, and the second plurality of fins are arranged at uniform angular intervals around the circumference of the second tube.

8. The finned tube assembly according to claim 1, wherein each fin of the first plurality of fins is angularly offset from a corresponding fin of the second plurality of fins by an angle of 1 to 20 degrees.

9. A finned tube assembly for an air-cooled condenser, the finned tube assembly comprising:
a first finned tube section having a unitary structure comprising:
a first tube having an inner surface forming a first cavity along a first longitudinal axis and an outer surface; and
a first plurality of external fins protruding radially outward from the outer surface of the first tube, the first plurality of fins integral with the first tube and extending substantially parallel to the first longitudinal axis;
a second finned tube section having a unitary structure comprising:
a second tube having an inner surface forming a second cavity along a second longitudinal axis and an outer surface; and
a second plurality of external fins protruding radially outward from the outer surface of the second tube, the second plurality of fins integral with the second tube and extending substantially parallel to the second longitudinal axis;
wherein the first finned tube section and the second finned tube section are discrete structural elements;
wherein a first end of the first finned section is abutted to a second end of the second finned tube section, the abutting first and second ends of the first and second finned sections being hermetically coupled directly together wherein a hermetic fluid path is formed through the first and second cavities of the first and second tubes;
wherein the discrete first finned tube section and the second finned tube section are arranged and rotated relative to each other so that the first and second longitudinal axes are in axial alignment and the first and second plurality of fins are angularly offset from one another.

10. A finned tube assembly for an air-cooled condenser, the finned tube assembly comprising:
an outer first finned tube section having a unitary structure comprising:
a first tube having an inner surface forming a first cavity along a first longitudinal axis and an outer surface; and
a first plurality of external fins protruding radially outward from the outer surface of the first tube, the first plurality of fins integral with the first tube and extending substantially parallel to the first longitudinal axis;
an outer second finned tube section having a unitary structure comprising:
a second tube having an inner surface forming a second cavity along a second longitudinal axis and an outer surface; and
a second plurality of external fins protruding radially outward from the outer surface of the second tube, the second plurality of fins integral with the second tube and extending substantially parallel to the second longitudinal axis;
an inner tube having an outer surface inserted and extending through the first and second cavities, the inner tube being in an expanded state in which the outer surface of the inner tube is in substantially conformal contact with the inner surfaces of the first and second tubes;
wherein the first finned tube section and the second finned tube section are discrete structural elements;
the discrete first finned tube section and the second finned tube section arranged and rotated relative to each other so that the first and second longitudinal axes are in axial alignment and the first and second plurality of fins are angularly offset from one another;
wherein a first end of the first finned section is abutted to a second end of the second finned tube section, the abutting first and second ends of the first and second finned sections being hermetically coupled directly together wherein a hermetic fluid path is formed through the first and second cavities of the first and second tubes.

11. The finned tube assembly according to claim 10, wherein the inner tube is formed of a first material that is different than a second material from which the first and second tubes are formed.

* * * * *